June 21, 1960 R. WAGNER 2,941,810

PHONOGRAPH

Filed Jan. 18, 1957

INVENTOR
Robert Wagner
By: George H. Fritzinger
Agt.

United States Patent Office 2,941,810

Patented June 21, 1960

2,941,810

PHONOGRAPH

Robert Wagner, Ford Road, Denville, N.J.

Filed Jan. 18, 1957, Ser. No. 635,008

9 Claims. (Cl. 274—13)

This invention relates to a phonographic mechanism for making recordings by the embossing method and for reproducing the same, and more particularly it relates to a very simple form of such mechanism capable of making and reproducing microgroove recordings (of 500 grooves per inch and more) and with high fidelity.

In making microgroove recordings, the groove convolutions must be uniformly spaced within close limits, mechanical vibration must be carefully isolated, and sudden bursts in amplitude at low frequencies must be avoided to prevent groove crossover. When such recordings are attempted with standard phonographic equipment, extremely close mechanical tolerances are required to provide the necessarily smooth, uniform and vibration-free operation. The equipment becomes therefore very expensive and difficult to operate.

In accordance with the present invention, however, I am enabled to make high-quality microgroove recordings on flexible disk records and to reproduce the same with high fidelity with the use of very simple and inexpensive recording equipment which does not require expert personnel to operate it. This is accomplished by providing the equipment with a combination of mechanical features:

(1) An averaging type of recorder-head feed comprising a microgrooved feed screw and a pad of yieldable material engaging a multiplicity of threads of the screw;

(2) A yieldable recorder head mounting having compliance in the direction of recorder-head feed; and (3) A vibration-free drive and support mechanism for the disk record which drives the disk from its hub and supports the usable portion of the disk slidably on a yieldable material. The use of these features in combination provides the maximum results for purposes of the present invention, but no unnecessary limitation of the invention to all features in combination is intended. For example, the compliant head mounting is a particularly useful feature by itself when used in making recordings by the embossing method because such compliance cooperates with the raised side wall of each preceding groove convolution to provide uniform groove spacing as well as overload protection against cross-grooving, as will appear.

An object of the invention is to provide a mechanical system for microgroove recording which is inexpensive, simple and easy to operate even by those inexperienced in the recording field.

Another object is to provide a simple and inexpensive mechanism capable of making records with high fidelity by the embossing method.

Another object is to provide a simple and practical mechanism for making high-fidelity recordings at pitches up to 500 grooves per inch and more.

Another object is to provide a mechanical system for microgroove recording and reproducing wherein the same record-cooperating translating device is used for both recording and reproducing.

Another object is to provide a mechanical feeding mechanism for a recorder head, which is characterized as having a compliant coupling with the feeding mechanism in the direction of recorder feed.

Another object is to provide such feeding mechanism which has a fixed inherent compliance to enable the head alternatively to track a record groove when the head is operated as a reproducer.

Another object is to provide a recording head and a compliant mounting therefor which is adapted to operate as a mechanical filter to provide the necessary low-frequency equalization.

Another object is to provide a compliant mounting for a recorder head which operates in conjunction with the resisting force of the raised side wall of the preceding groove convolution when the groove is formed by embossing, to serve as a volume-compression means effective in practice to prevent crossover of one groove onto another.

These and other objects and features of my invention will be apparent from the following description and the appended claims.

In the description of my invention reference is had to the accompanying drawings, of which:

Figure 1 is a side elevational view, with parts shown in section on the line 1—1 of Figure 2, of a phonographic mechanism embodying my invention;

Figure 1*a* is a fractional elevational view with parts in section on the line 1*a*—1*a* of Figure 2;

Figures 1, 1A:
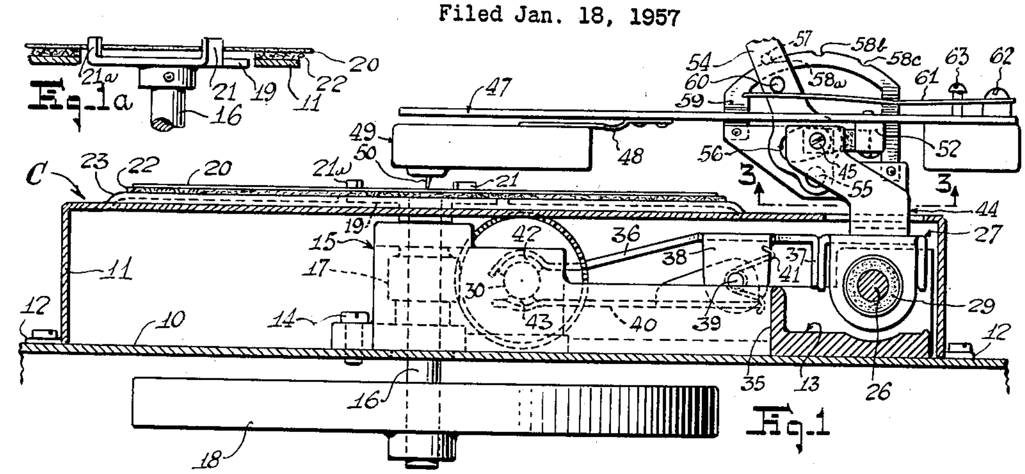
Figure 2:
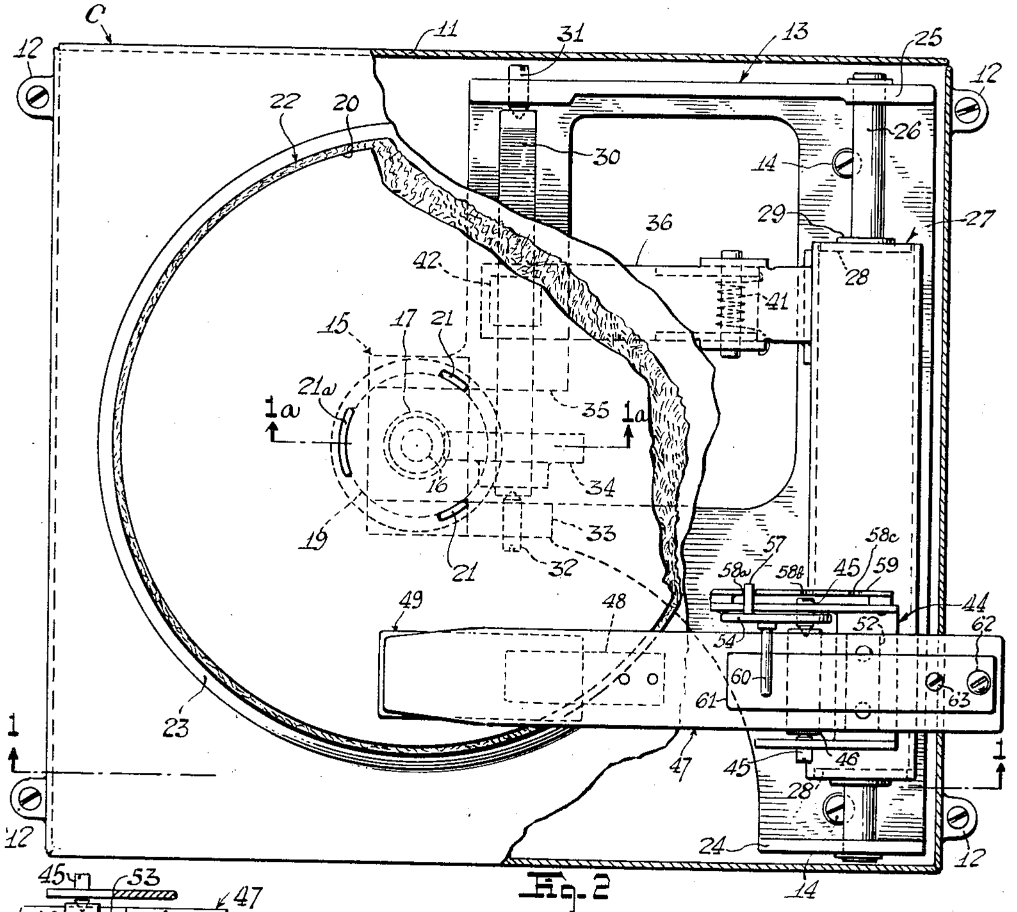
Figure 2 is a plan view of the phonographic mechanism showing a portion of the cabinet and record-supporting means broken away for better illustration of the internal parts.

The phonograph shown in the accompanying figures comprises a mounting plate 10 which is supported by a lower housing structure not shown and which forms the base for an upper housing section 11 secured thereto as by lugs 12 struck outwardly from the housing section. Mounted in the cabinet C formed by the plate 10 and upper housing section 11 is a frame 13 cast as of aluminum. This frame seats flat on the plate 10 in the rearward half of the cabinet C (the right half of the machine as shown in Figures 1 and 2) and is secured to the plate 10 by screws, as indicated at 14. The frame has a hollow rectangular cage-like portion 15 at the center of the machine provided with vertically-spaced bearings in the upper and lower walls thereof. Journaled in these bearings is a vertical shaft 16 which extends through clearance openings in the top and bottom of the cabinet C. The shaft 16 is located vertically by abutment against the top and bottom walls of the cage 15 of a worm 17 secured to the central portion of the shaft. Secured to the lower end of the shaft is a large flywheel 18 on which may also ride a belt (not shown) for coupling the shaft to a drive motor (not shown). Secured to the upper end of the shaft is a circular drive plate 19 for engaging only the central hub portion of a disk record 20. This drive plate has lugs 21 struck upwardly from the rim thereof which are arcuate about the shaft 16 as a center and which are adapted for engaging corresponding arcuately-shaped drive slots in the disk record. Preferably, one of the drive lugs, designated 21*a* in Figure 2, is provided with a greater arcuate length than the others, as is also one of the drive holes in the disk record, so that the record can be mounted in only one angular orientation to the shaft 16. The disk record is made of a thin, flexible, plastic material such as Vinylite. One of the combination of features in the present machine characterizing my invention is in slidably supporting the annular usable portion of the disk record on an annular stationary pad 22 of a yieldable material such as felt. This pad is mounted directly on the top wall of the cabinet C at a level just slightly higher than that of the central drive plate 19 to assure that the disk record will lie flat at all times on the supporting pad. For appearance purposes, the pad 22 may be mounted on a slightly-raised circular platform 23 formed in the top wall of the cabinet as by a drawing operation. By using a flexible disk record driven from its hub portion and supported slidably throughout its usable portion on a soft, yieldable pad, machine vibration is prevented from being transmitted to the usable portion either via the drive shaft or the frame.

The frame 13 extends the full width of the cabinet C at the back end thereof and has an upright standard 24 at its right end and an upright standard 25 along its left end. These standards carry a transverse support rod 26 for a carriage 27. The main portion of this carriage is in the form of a bail overlying the support rod 26 and having apertured lugs 28 bent downwardly from the ends thereof. These lugs embrace the ends of a long, tubular bearing 29 which is slidable on the support rod. The carriage is driven progressively along the support rod by a feed screw 30 supported parallel thereto at the front thereof. This feed screw is journaled at its left end on a cone pivot 31 carried by the standard 25 and at its right end on a cone pivot 32 carried by a standard 33 upstanding from the frame 13 just to the rear of the right end of the cage 15. Secured to the right end portion of the feed screw is a gear 34 which meshes with the worm 17 on the drive shaft 16. Clearance for the gear is provided by an opening 35 in the bottom wall of the frame 13 to the rear of the cage 15. This opening is extended throughout the central portion of the frame for saving weight and material. The means for coupling the carriage to the feed screw comprises a forwardly-extending arm 36 bracketed at 37 to the carriage. This arm terminates at its forward end in an arcuate portion overlying the feed screw. Bent downwardly from the intermediate portion of the arm 36 are side lugs 38 traversed by a rod 39 on which a lower arm 40 is pivoted. The arm 40 terminates in an arcuate portion below the feed screw. Under influence of a torsion spring 41 between the lower arm 40 and one of the lugs 38, the two arms 36 and 40 are clamped against the feed screw, it being understood that the upper arm 36 which is rigid with the carriage can find an equalized clamping position with the other arm because the carriage not only slides but also can pivot on the support rod 26.

In accordance with another one of the combination of features characterizing my invention, the arms 36 and 40 engage the feed screw through respective pads 42 and 43. These pads, which are made of a resilient material such as of felt, engage the feed screw over a multiplicity of the threads thereof. In so doing there is obtained an averaging out of the engagement with the individual threads to provide a very uniform driving action; also, because of the resilient nature of the clamping engagement of the arms with the feed screw, transmission of vibration from the drive mechanism to the carriage is effectively reduced. This form of carriage-drive mechanism is found to be a very satisfactory one when the carriage is to be driven very slowly to make microgrooved recordings as of the order of 500 grooves or more per inch.

It is important in making microgrooved recordings that the number of threads per inch on the feed screw be as near as possible to a 1:1 ratio with the number of grooves per inch to be formed on the record. For instance, if the ratio of the speed of the turntable to that of the feed screw were of the order of 8:1 as is typical in standard phonographic equipment, an error of ⅛ of the pitch of the thread on the feed screw would represent a 100% pitch error on the record, which would mean that there would be a complete crossover of one groove onto the next. To circumvent this possibility, I employ a microgrooved feed screw engaged over a multiplicity of threads by a yieldable pad such as of felt. This feed screw is provided with a number of threads per inch equal to or not less than half the number of grooves per inch on the record. It is found that when a drive pad of felt-like material is used, the driving action on the carriage is not positive or reliable unless the feed screw has of the order of 200 threads per inch or more. This is because such drive pad would have insufficient interengagement between the fibers thereof and the feed screw were the feed screw to have a coarser thread. If a coarser feed is desired, the feed screw is provided with a multiple thread in order to maintain the necessary fineness of thread to assure positive interengagement between the driving pad and the feed screw.

Although a felt driving pad will interengage with a microgrooved feed screw to provide a positive and reliable drive of the carriage, the carriage can nonetheless be forcibly moved by hand without the necessity of releasing the driving pad from the feed screw and yet the pad will not undergo any appreciable wear because of the fineness of the threads on the feed screw. Such permissible shifting of the carriage without need for releasing the clamping engagement of the pad with the feed screw greatly simplifies the control mechanism of the phonograph.

Onto the right end of the carriage 27 there is secured as by riveting an upright U-bracket 44 having the legs thereof extending obliquely to the left as shown in Figure 1. This bracket carries a pair of cone pivots 45 which pivotally engage the ends of a cross bar 46 as later explained. A recorder-reproducer arm 47 is secured to this cross bar, and extends forwardly over the right half portion of a disk record 20. Secured to the forward portion of this arm through a flat cantilever spring 48 is a recorder-reproducer translating device 49 having a record-engaging stylus 50. This translating device may be of a standard variety and need not therefore be herein specifically described other than to say that the stylus 50 is vibrated laterally with respect to the arm to provide a laterally-modulated record groove when an alternating signal is fed into the translating device, and that the device will generate a corresponding output signal when it is next caused to scan such modulated groove. The advantage of the spring coupling 48 is to cushion the translating device vertically so that if the arm 47 is inadvertently dropped onto the record the stylus will not readily indent the same.

Figure 3:
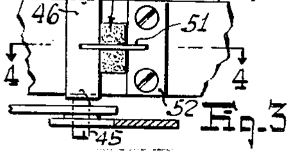
Figure 3 is a fractional horizontal section taken on the line 3—3 of Figure 1.
Figure 4:
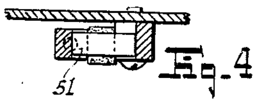
Figure 4 is a fractional section taken on the line 4—4 of Figure 3.

An important feature of the present invention is in providing lateral compliance in the direction of carriage movement between the vibratile element of the translating device and the carriage. Such compliance may be between the vibratile element of the translating device and its housing, between the device itself and the arm, or between the arm and the carriage. By way of preferred illustrative example, this lateral compliance is herein shown as being between the arm 47 and the carriage 27 by coupling the arm 47 to the cross bar 46 through a flat spring 51 in a plane at right angles to the disk record. For example, one end of this spring may be received in a cross-cut in the bar 46 and be soldered or brazed thereto, and the other end may be similarly secured to a block 52 held as by screws to the under side of the arm 47 as indicated in Figure 3. However, in order to suitably damp the transverse vibratile movement so permitted of the arm 47 relative to the carriage, the intermediate portion of the spring 51 is embraced by a pad 53 of a damped viscous material such as that known commercially as Viscoloid. Typically, the compliance of the spring 51 is such, in relation to the rotational mass of the arm 47, that the natural lateral resonance of the arm is at the lower end of the desired frequency spectrum.

The advantages of providing such lateral compliance between the translating device and the carriage are manyfold. Firstly, this compliance in cooperation with the raised wall which is formed at the side edges of the record groove when the groove is made by embossing assures that the stylus is advanced uniformly across the record to provide the highly-uniform pitch necessary in making microgroove recordings. For instance, the raised wall along the adjacent side edge of each preceding groove convolution forms a barrier to the stylus when making the next groove convolution which is effective to prevent the stylus from being propelled over into the adjacent groove by random machine forces when those forces are cushioned by being transmitted through the compliant coupling between the recorder arm and carriage. In other words, the compliant coupling will "give" because of the side wall resistance of the next preceding groove should a sudden force develop from motor vibration, eccentricities of rotating parts, uneven bearing friction, etc. which would otherwise be effective to displace the stylus sidewise by the small distance between successive grooves. Thus, there is obtained an extremely uniform feed of the stylus, aided by the averaging feed action of the multiple-thread engagement of the drive pad with the feed screw, which enables very finely-pitched recordings to be made without requiring close mechanical tolerances.

Secondly, the compliant coupling of the translating device with the carriage operates also in conjunction with the adjacent raised-wall barrier of the preceding groove convolution to provide a limitation on the groove modulation effective to prevent groove crossover in response to any signal of inordinately-high volume being fed into the recorder. As the groove pitch is made smaller, the lateral range of modulation of the grooves must be correspondingly limited. Without the benefit of the inherent volume limitation on the record which I obtain, the user of microgroove recording equipment must monitor the volume level very carefully. With my recording system, signals of inordinately-high level can be tolerated without encountering groove crossover. Although signals of such extreme levels will be recorded with some volume distortion, this is far preferable to the alternative of encountering groove crossover because if the latter were to occur the recording would be so disrupted as to be unusable by reason of the inability to progressively track the groove on playback.

Thirdly, the compliant coupling of the translating device with the carriage permits a great simplification in the selective control of combined recorder-reproducer machines. In the usual machine, the translating device is rigidly secured to the drive carriage during recording and is universally pivotally connected to the carriage for ease of tracking during reproducing. In the present machine, however, the same compliant coupling which I provide between the translating device and the carriage during recording is sufficient to enable ease of tracking during reproducing. I am enabled therefore to use the same translating device and the same system of stylus feed during reproducing as during recording. The only mechanical change which is desirably made to condition the machine selectively for recording and reproducing is that of providing a greater biasing force on the stylus against the record during recording than during reproducing. This is carried out simply by a control lever 54 pivoted at 55 to the left leg of the bracket 44 at a point below the respective cone pivot 45 and projecting upwardly to form a handle above the recorder-reproducer arm 47, there being a suitable clearance opening 56 in the lever for the cone pivot. This lever can be detented in a forward recording position, a central reproducing position, or a rearward neutral position with respect to the recorder-reproducer arm 47 by engagement of a cross pin 57 on the lever with respective notches 58*a*, 58*b* and 58*c* provided in an arcuate edge of a bracket 59 secured at its ends also to the left leg of the bracket 44 rigidly mounted on the carriage. The lever 54 has a cross pin 60 overlying the arm 47. The arm 47 has an extension rearwardly of its pivots 45 to which a cantilever spring 61 is secured by a clamping screw 62. The spring 61 extends forwardly along the arm 47 to a point past the pivots 45. When the control lever 54 is detented in its forward position, the cross pin 60 bears downwardly against the forward end of the cantilever spring 61 to increase the bias force of the stylus against the record. When the lever 54 is detented in an upright position, the pin 60 is free of the spring 61 to cause the pressure of the stylus to be somewhat relieved, this being a suitable condition for reproducing. But when the control lever 54 is shifted to its rearward position, the pin 60 bears against the spring 61 to the rear of the pivots 45 to cause the arm 47 to be lifted sufficiently to disengage the translating device from the mounted disk record. An adjusting screw 63 is provided for suitably positioning the spring 61 to provide the desired differential in biasing force when the control lever 54 is shifted to its different positions.

Fourthly, an advantage which may be realized from the use of the compliant mounting for the recorder-reproducer arm 47 is that it can be utilized to provide inherently the necessary equalization for shifting the recording operation from an effectively constant amplitude basis below a certain crossover frequency—typically of the order of 700 cycles per second—to a constant velocity basis above that frequency. This is accomplished simply by adjusting the compliance of the spring 51 so that the natural frequency of resonance of the recorder arm is at the lower end of the audio spectrum—typically at about 100 cycles per second—and by suitably damping the arm with the use of the damping means 53 hereinbefore described. When such equalization is inherent in the mechanical recording equipment, the user can make recordings with an amplifier having a flat gain—frequency characteristic—which is a great boon to users in making home recordings. By so obtaining the necessary equalization during recording by mechanical means without the need for additional equipment over and above that already provided for other useful purposes, still greater simplification of the over-all equipment is achieved.

The particular embodiment of my invention herein shown and described for purposes of illustration is subject to changes and modifications without departure from the scope of my invention, which I endeavor to express according to the following claims.

I claim:

1. In a phonographic system, the combination of: a drive and support mechanism for driving and supporting a disc record, said mechanism including a rotatable drive member; a recording head having a record-cooperating stylus; a carriage for said recording-head mounted for traveling movement; means for progressively moving said carriage as said rotatable drive member is rotated; and a coupling between said recording head and carriage having compliance providing yieldability to said recording head relative to said carriage in the direction of said traveling movement.

2. The combination set forth in claim 1 wherein the mechanical mass associated with said recording head has a natural resonance with said compliance within the lower audio spectrum, including means for damping said resonance.

3. In a phonographic system, the combination of: a drive and support mechanism for driving and supporting a disc record, said mechanism including a rotatable drive member; a recording head having a record-cooperating stylus; a carriage for said recording-head mounted for traveling movement; means for progressively moving said carriage as said rotatable drive member is rotated; an arm having said recording head mounted on one end portion thereof and having a universal coupling with said carriage at its other end portion providing freedom of movement to said recording head both towards and away from a record supported by said mechanism and in lateral directions corresponding to the direction of traveling movement of said carriage; and compliant means included in said universal coupling for placing said arm under yieldable restraint against movement in said lateral directions.

4. In a phonographic system, the combination of: a drive and support mechanism for driving and supporting a disc record, said mechanism including a rotatable drive member; a translating head having a record-cooperating stylus for embossing the record during recording and for tracking the record during reproducing, said embossing operation to raise a wall along each side of the groove; a carriage for said translating head mounted for traveling movement; means for progressively moving said carriage as said rotatable member is rotated, to cause said stylus to describe successive groove convolutions during recording; means mounting said translating head on said carriage, said mounting means having a damped compliance providing yieldability to said translating head in directions of movement of said carriage adapted to enable said head to track a record groove during reproducing, said compliance being constrained during recording by the raised wall at the side edge of each preceding groove convolution to caause said stylus to describe a groove of uniform pitch during recording; and means for selectively conditioning said head for recording and reproducing by providing the head with a given bias force against the record during recording and with a lesser bias force during reproducing.

5. In a phonographic system, the combination of: a drive and support mechanism for driving and supporting a disc record, said mechanism including a rotatable drive member; a recording head having a stylus for producing a record groove by embossing; a carriage for said head mounted for traveling movement; a compliant mounting on said carriage for said head adapted to provide yieldability to said head in directions of movement of said carriage; and means for providing a uniform progressive movement of said carriage adapted to cause said head to describe a record groove of uniform pitch comprising a rotatable feed screw, screw drive means drivingly connecting said rotatable drive member to said rotatable feed screw, and a yieldable compliant pad carried with said carriage and pressed against said feed screw over a multiplicity of threads thereof.

6. In a phonograph system, the combination of: a drive and support mechanism for driving and supporting a disc record, said mechanism including a rotatable drive member; a recording head having a stylus for producing a groove on said record by embossing, said embossing operating to raise a wall along each side edge of the groove; a carriage for said head mounted for traveling movement; means for progressively moving said carriage as said drive member is rotated whereby successive groove convolutions are produced on the record by said stylus, said recording head being electrically energizable to laterally modulate said groove; and a compliant mounting on said carriage for said head providing said head with a lateral yieldability adapted to prevent said stylus from crossing the raised wall of the next preceding groove convolution when said head is energized by signals of high amplitude.

7. In a phonograph: the combination of a recording head having an embossing stylus; a vibration-free drive and support mechanism for turning and supporting a flexible disk record relative to said head to produce a spiral groove thereon by the embossing method having a wall raised along each side edge of the groove, said drive and support mechanism comprising rotatable means for engaging only the central hub portion of the disk record, and a stationary annular pad of a yieldable material for slidably supporting the annular usable portion of the disk record; a carriage for said recording head; means for uniformly driving said carriage comprising a rotating feed screw and clamping means of yieldable material engaging said feed screw over a multiplicity of threads thereof; a mounting arm on said carriage for said recording head; and a damped compliant means securing said arm to said carriage to provide yieldability to said recording head relative to said carriage in directions of movement of the latter.

8. In a phonograph system adapted for making microgrooved recordings by embossing: the combination of a drive and support mechanism for a disc record of embossable material; a recording head having an embossing stylus; a carriage for said head mounted for traveling movement; a compliant coupling between said head and said carriage having yieldability in directions of movement of the carriage; and a drive mechanism for said carriage comprising a microgrooved feed screw having at least of the order of half the threads per inch as the number of grooves per inch to be formed on the record, a drive connection between said feed screw and record drive mechanism, and a driving pad of yieldable material connected to said carriage and pressed against said feed screw over a multiplicity of threads thereof.

9. In combination: a feed screw having a number of threads of at least 200 per inch; a drive mechanism and support for driving and supporting a disc record, including a rotatable drive member; a record-cooperable translating head; a carriage for said head mounted for traveling movement; a yieldable pressure pad clamped against said feed screw over a multiplicity of threads thereof and connected to said carriage for imparting an average movement of said threads to said carriage as said feed screw is rotated; a drive connection between said feed screw and said rotatable drive member; and a compliant coupling between said head and said carriage having a compliance in the direction of carriage movement adapted to cause the translation-frequency characteristic of said head on the record to fall off at the lower end of the audio spectrum.

References Cited in the file of this patent

UNITED STATES PATENTS

| | | |
|---|---|---|
| 1,860,104 | Larsen | May 24, 1932 |
| 2,115,863 | Lichten | May 3, 1938 |
| 2,142,563 | Harris | Jan. 3, 1939 |
| 2,177,692 | Di Toro | Oct. 31, 1939 |
| 2,446,324 | Di Ghilini | Aug. 3, 1948 |
| 2,455,466 | Brubaker | Dec. 7, 1948 |
| 2,488,608 | Sinnett | Nov. 22, 1949 |
| 2,561,466 | Gahagan | July 24, 1951 |